United States Patent [19]
Wachman et al.

[11] Patent Number: 5,796,512
[45] Date of Patent: Aug. 18, 1998

[54] SUBICRON IMAGING SYSTEM HAVING AN ACOUSTO-OPTIC TUNABLE FILTER

[75] Inventors: Elliot S. Wachman; Daniel L. Farkas; Wen-Hua Niu, all of Pittsburgh, Pa.

[73] Assignee: Carnegie Mellon University, Pittsburgh, Pa.

[21] Appl. No.: 603,035

[22] Filed: Feb. 16, 1996

[51] Int. Cl.⁶ ............................................. G02F 1/33
[52] U.S. Cl. .......................... 359/308; 359/285; 359/309; 359/314; 359/330; 356/300; 250/339.02; 372/21
[58] Field of Search ........................... 359/285, 330, 359/328, 308, 309, 305, 314; 356/300, 39; 250/339, 339.02, 458.1; 372/18, 20, 21

[56] References Cited

U.S. PATENT DOCUMENTS

| | | | |
|---|---|---|---|
| 3,667,038 | 5/1972 | Cutler et al. | 359/309 |
| 3,679,288 | 7/1972 | Harris | 359/314 |
| 3,698,792 | 10/1972 | Kusters | 359/314 |
| 4,150,880 | 4/1979 | Howe et al. | 359/309 |
| 4,684,828 | 8/1987 | Sommargren | 359/285 |
| 4,883,963 | 11/1989 | Kemeny et al. | 250/339 |
| 4,896,949 | 1/1990 | Melamed et al. | |
| 4,940,316 | 7/1990 | Brandt. | |
| 5,120,961 | 6/1992 | Levin et al. | 250/339 |
| 5,365,366 | 11/1994 | Kafka et al. | 372/21 |
| 5,377,003 | 12/1994 | Lewis et al. | 356/300 |
| 5,410,371 | 4/1995 | Lambert | 359/285 |

OTHER PUBLICATIONS

J. Hallikainen, J.P.S. Parkkinen, and T. Jaaskelainen, "Color Image Processing With AOTF," Proceeding of 6th Scandinavian Conference on Image Analysis; Oulu, Finland; Jun. 19–22, 1989, vol. 1, M. Pietikainen and J. Roning, eds., 294–300 (1989).

T. Chao, J. Yu, L. Cheng, and J. Lambert, "AOTF Imaging Spectrometer for NASA Applications: Breadboard Demonstration," Proc. Soc. Photo–Opt. Instrum. Eng. 1347, 655–663 (1990).

D.A. Glenar, J.J. Hillman, B. Seif, and J. Bergstrahl, "POLARIS II: An Acousto–optic Imaging Spectropolarimeter For Ground Based Astronomy," Polarization and Remote Sensing, W.G. Egan, ed., Proc. Soc. Photo–Opt. Instrum. Eng. 1747, 92–101 (1992).

I.C. Chang, "Electronically Tuned Imaging Spectrometer Using Acousto–optic Tunable Filter," Proc. Soc. Photo–opt. Instrum. Eng. 1703, 24–29 (1992).

D.R. Suhre, M. Gottlieb, L.H. Taylor, and N.T. Melamed, "Spatial Resolution of Imaging Noncollinear Acousto–optic Tunable Filters," Opt. Eng. 31, 2118–2121 (1992).

Y. Chi, D.Cui, and J. Tang, "Study on the Characteristics of an Imaging Spectrum System by Means of an Acouto–optic Tunable Filter," Opt. Eng. 32, 2899–2902 (1993).

G. Gao and Z. Lin, "Acouto–optic Supermultispectral Imaging," Appl. Opt. 32, 3081–3086 (1993).

L. Cheng, T. Chao, M. Dowdy, C. LaBaw, C. Mahoney, and G. Reyes, "Multispectral Imaging Systems Using Acousto–optic Tunable Filter," Proc. Soc. Photo–Opt Instrum. Eng. 1874, 224–231 (1993).

T. Chao, G. Reyes, E. Hegbloom and L. Cheng, "Spatial–spectral Optical Pattern Recognition Using an Acousto–optic Tunable Filter Preprocessor," Proc. Soc. Photo–Opt. Instrum. Eng. 1959, 410–415 (1993).

(List continued on next page.)

*Primary Examiner*—Loha Ben
*Attorney, Agent, or Firm*—Kirkpatrick & Lockhart LLP

[57] ABSTRACT

An imaging system comprises an acousto-optic tunable filter for receiving light at an input end thereof and outputting light at an output end thereof. A control circuit is provided for tuning the filter. A prism is responsive to the light output by the tunable filter. The prism is oriented at an angle with respect to the filter to compensate for dispersion of the output light caused by the tunable filter.

24 Claims, 12 Drawing Sheets

OTHER PUBLICATIONS

R.B. Wattson, S.A. Rappaport, and E.E. Frederick, "Imaging Spectrometer Study of Jupiter and Saturn," Icarus 27, 417–422 (1976).

W.H. Smith, "Spectral Differential Imaging Detection of Planets About Nearby Stars," Publ. Astron. Soc. Pacif. 99, 1344–1353 (1987).

W.H. Smith and K.M. Smith, "A Polarimetric Spectral Imager Using Acousto–optic Tunable Filters," Exp. Astr. 1, 329–343 (1991).

D.A. Glenar, J.J Hillman, B. Seif, and J. Bergstralh, "Acoustic–optic Imaging Spectropolarimetry for Remote Sensing," Appl. Opt. 33, 7412–7424 (1994).

H.R. Morris, C.C. Hoyt and P.J. Treado, "Imaging Spectrometers for Fluorescence and Ramam Microscopy: Acoustic–optic and Liquid Crystal Tunable Filters," Appl. Spect. 48, 857–866 (1994).

P.J. Treado, I.W. Levin and E.N. Lewis, "High–Fidelity Raman Imaging Spectrometry: A Rapid Method Using an Acousto–optic Tunable Filter," Appl. Spectr. 46, 1211–1216 (1992).

M.D. Schaeberele, J.F. Turner II, and P.J. Treado, "Multiplexed Acousto–optic Tunable Filter Spectral Imaging Microscopy," Proc. Soc. Photo–Opt. Instrum. Eng. 2173, 11–20 (1994).

I. Kurtz, R. Dwelle and P. Katzka, "Rapid Scanning Fluorescence Spectroscopy Using an Acousto–optic Tunable Filter," Rev. Sci. Instrum. 58, 1996–2003 (1987).

P. Treado, I. Levin, E. Lewis, "Near–Infrared Acousto–optic Filtered Spectroscopic Microscopy: A Solid–State Approach to Chemical Imaging," Appl. Spectr. 46, 553–559 (1992).

K. Spring, P. Smith, "Illumination and Detection Systems for Quantitative Fluorescence Microscopy," Royal Microscopical Society, 265–278 (1987).

Article Entitled "Technical Support Package, Compact, Automated, Frequency–Agile Microspectrofluorimeter," National Aeronautics and Space Administration, NASA Tech Briefs KSC–11611, Aug. 1995.

100x OBJECTIVE:
DECONVOLVED IMAGE

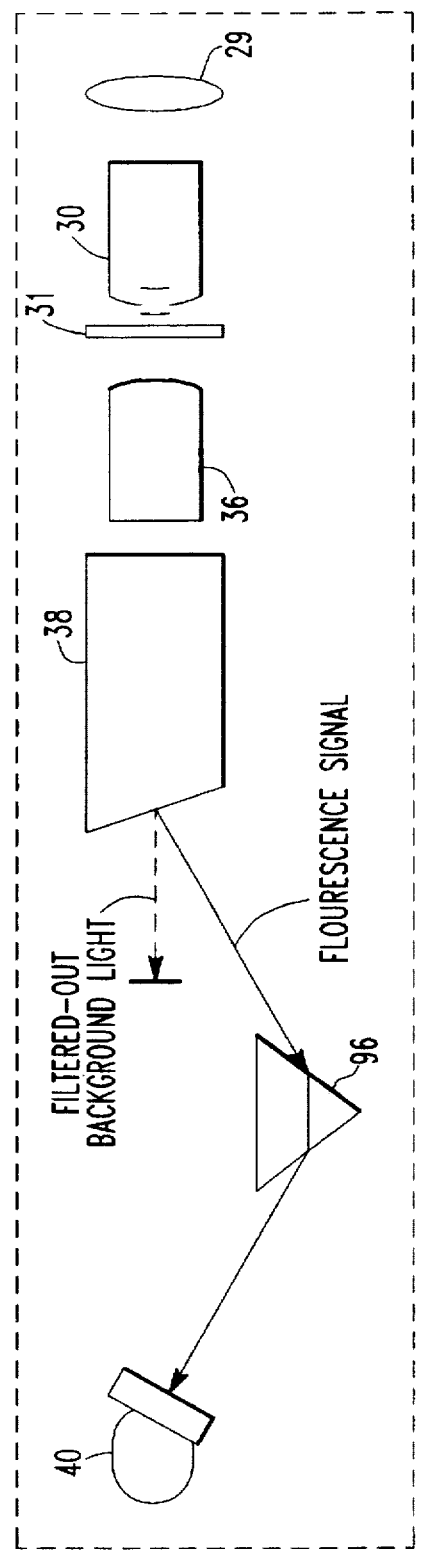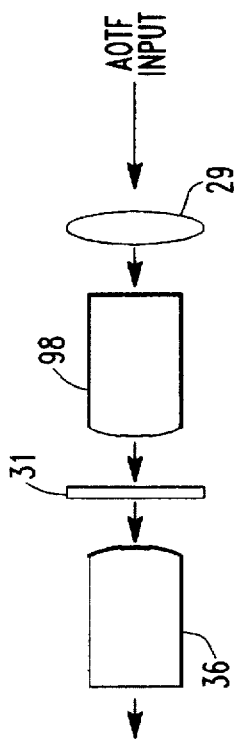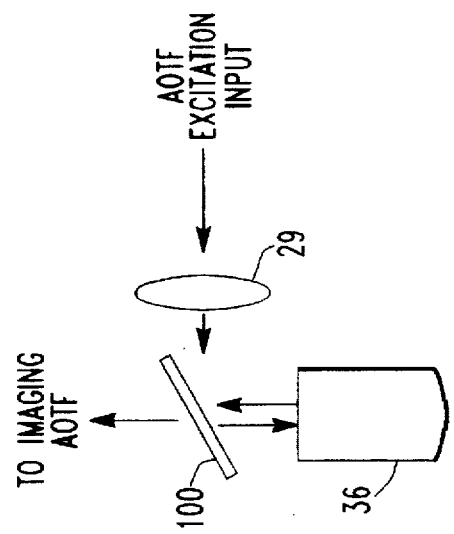

SUBICRON IMAGING SYSTEM HAVING AN ACOUSTO-OPTIC TUNABLE FILTER

BACKGROUND OF THE INVENTION

CROSS REFERENCE TO RELATED APPLICATION

This application is related to U.S. patent application Ser. No. 08/603,030 entitled Light Microscope Having Acousto-Optic Tunable Filters filed Feb. 16, 1996 by the same inventors.

FIELD OF THE INVENTION

The present invention is directed generally to imaging systems of the type which have no moving parts.

DESCRIPTION OF THE BACKGROUND

The potential of acousto-optic tunable filters (AOTFs) for multispectral applications has been recognized for over twenty years. AOTFs provide electronically controllable, solid-state, tunability from the ultraviolet to the near-infrared, with bandpass variability, high throughput, and wavelength switching speeds in the tens of microseconds. Those features have led to the use of AOTFs in a wide variety of spectroscopic applications. Interest in AOTFs for multispectral imaging has, however, been more recent. Several groups have reported breadboard AOTF imaging demonstrations. See Y. Cui, D. Cui, and J. Tang, "*Study on the characteristics of an imaging spectrum system by means of an acousto-optic tunable filter,*" Opt. Eng. 32, pp. 2899-2902 (1993); G. Gao and Z. Lin, "*Acousto-optic supermultispectral imaging,*" Appl. Opt. 32, pp. 3081-3086 (1993). Others have successfully used AOTFs for remote sensing of ground-based targets. See L. Cheng, T. Chao, M. Dowdy, C. LaBaw, C. Mahoney, and G. Reyes, "*Multispectral imaging systems using acousto-optic tunable filter,*" Proc. Soc. Photo-Opt. Instrum. Eng. 1874, pp. 224-231 (1993); T. Chao G. Reyes, E. Hegbloom, and L. Cheng, "*Spatial-spectral optical pattern recognition using an acousto-optic tunable filter preprocessor,*" Proc. Sec. Photo-Opt. Instrum. Eng. 1959, pp. 410-415 (1993). Others have used AOTFs for remote sensing of planetary targets. See, D. A. Glenar, J. J. Hillman, B. Seif, and J. Bergstrahl, "*POLARIS II: an acousto-optic imaging spectropolarimeter for ground based astronomy,*" in Polarization and Remote Sensing, W. G. Egan, ed., Proc. Soc. Photo-Opt. Instrum. Eng. 1747, pp. 92-101 (1992); D. A. Glenar, J. J. Hillman, B. Seif, and J. Bergstralh, "*Acousto-optic imaging spectropolarimetry for remote sensing,*" Appl. Opt. 33, pp. 7412-7424 (1994). Treado et al. have used imaging AOTFs for fluorescence (H. R. Morris, C. C. Hoyt and P. J. Treado, "*Imaging spectrometers for fluorescence and Raman microscopy: acousto-optic and liquid crystal tunable filters,*" Appl. Spectr. 48, pp. 857-866 (1994)) and Raman (P. J. Treado, I. W. Levin and E. N. Lewis, "*High-fidelity Raman imaging spectrometry: a rapid method using an acousto-optic tunable filter,*" Appl. Spectr. 46, pp. 1211-1216 (1992); M. D. Schaeberle, J. F. Turner II, and P. J. Treado, "*Multiplexed acousto-optic tunable filter spectral imaging microscopy,*" Proc. Soc. Photo-Opt. Instrum. Eng. 2173, pp. 11-20 (1994)) microscopy of biological samples.

Poor imaging quality has been a recurring difficulty with imaging AOTFs. To date, the best reported resolution has been on the order of 8-10 μm. Those results, while sufficient for many applications, are completely inadequate for high-resolution light microscopy, in which a spatial resolution under 0.5 μm is routinely required. As a result, although there is a great potential for AOTFs in the area of high resolution imaging, there has been relatively little development in the field since their initial use nearly a decade ago.

SUMMARY OF THE INVENTION

The present invention is directed, in one embodiment, to a system comprising an acousto-optic tunable filter for receiving light at an input end thereof and outputting light at an output end thereof. A control circuit is provided for tuning the filter. A prism is responsive to the light output by the tunable filter. The prism is oriented at an angle with respect to the filter to compensate for dispersion of the output light caused by the tunable filter.

By inserting a prism in the fluorescence light signal, dispersion caused by the acousto-optic tunable filter is compensated, thereby improving the quality of the image. The compensation provided by the prism is achieved at virtually no cost in signal intensity. Using an apodized crystal decreases background levels. Using the imaging system of the present invention with a CCD camera or the like allows the image to be captured and digitized. The digitized image can be subjected to known techniques for normalizing the image, reducing background, etc. An imaging system constructed according to the teachings of the present invention may achieve resolutions on the submicron level. Those advantages and benefits, and other advantages and benefits, of the present invention will become apparent from the Description Of The Preferred Embodiments hereinbelow.

BRIEF DESCRIPTION OF THE DRAWINGS

For the present invention to be clearly understood and readily practiced, the present invention will be described in conjunction with the following figures wherein:

FIGS. 17, 18, and 19 illustrate alternative embodiments for the imaging portion of the system illustrated in FIG. 1.

DESCRIPTION OF THE PREFERRED EMBODIMENTS

Although mechanisms of image blur in AOTFs have been qualitatively described, detailed investigations of the effect and attempts to correct it have not been reported. By quantifying through experimental demonstration the causes of AOTF image blur, digital image processing techniques can be used to computationally remove the image degradation. By utilizing the teachings of the present invention, images can be obtained in which features down to the resolution of the microscope can be clearly distinguished.

Figure 1:
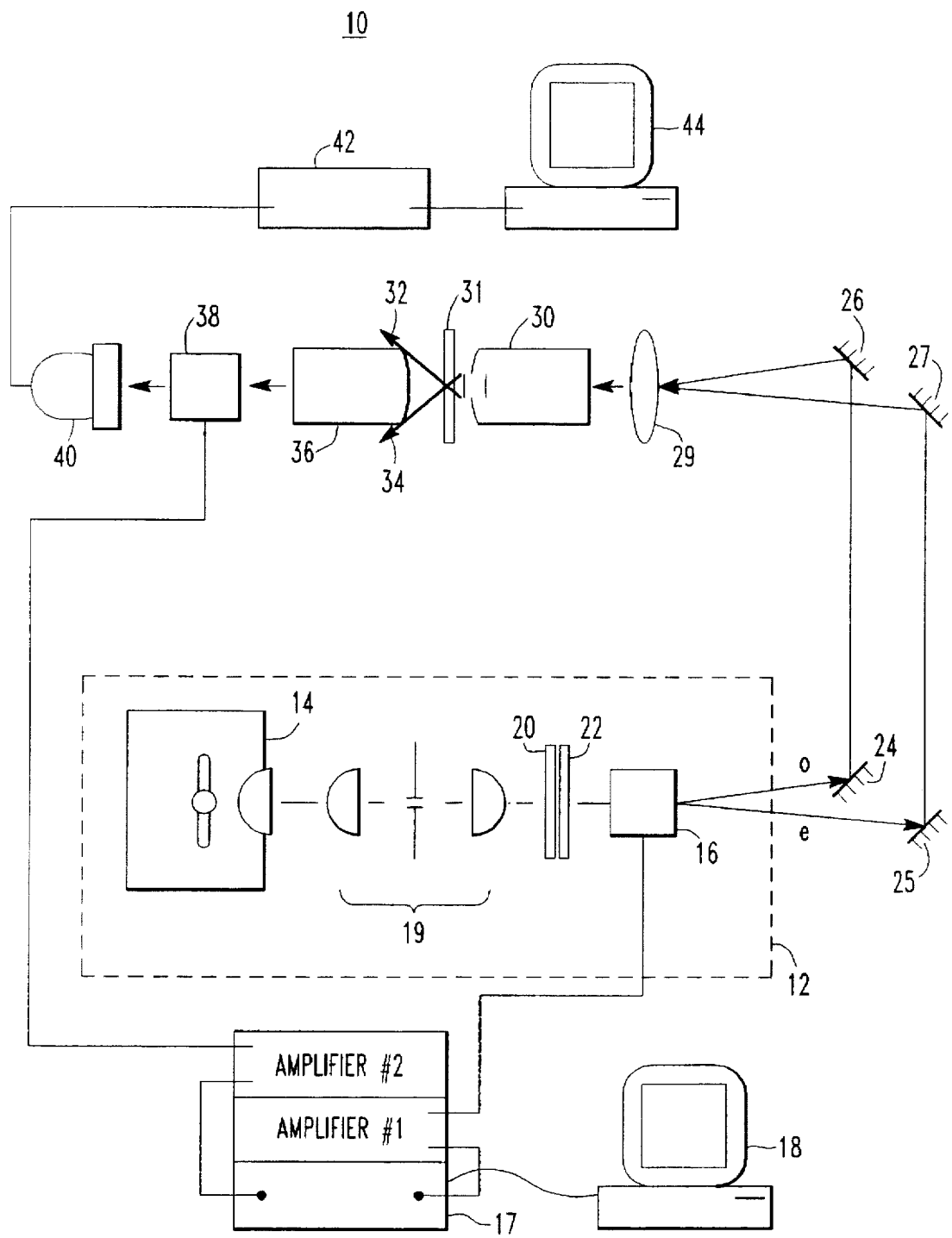
FIG. 1 illustrates a light microscope constructed according to the teachings of the present invention.

FIG. 1 illustrates a light microscope 10 constructed according to the teachings of the present invention. The light microscope 10 has an excitation portion 12 which includes an excitation source 14. Because of the losses inherent in acousto-optic tunable filters and optics traditionally used in microscopes, it is necessary to provide a powerful, point light source so as to provide sufficient illumination to illuminate the sample. In one embodiment, a light source 14 which is a 500 watt xenon arc lamp having a short arc, e.g. an arc length of less than one millimeter, is used. A multiline laser source may also be used.

The excitation portion 12 includes an acousto-optic tunable filter (AOTF) 16. The AOTF 16 is tuned by an arbitrary wave-form generator 17 through the first of two independent output amplifiers. An AOTF control work station 18 may be provided for controlling the wave-form generator 17 and for viewing the signals applied to the AOTF 16. It is desirable under certain circumstances, as will be discussed in greater detail hereinbelow, to multiplex the signals which are applied to tune AOTF 16. By multiplexing signals, the band of frequencies passed by the filter 16 can be increased.

It is known that acousto-optic tunable filters can be damaged if appropriate precautions are not taken. Also, it is desirable to process the light so that the rays are essentially parallel to one another. Accordingly, interposed between light source 14 and AOTF 16 are spatial filter 19, infrared filter 20, and ultraviolet filter 22.

The light produced by light source 14, after passing through filters 19, 20, and 22, is input to the AOTF 16. The AOTF 16 produces two streams of light, one o-polarized and one e-polarized. Steering optics, which may take the form of mirrors 24, 25, 26, and 27, steer the two light streams of different polarization so as to combine the two light streams into a combined stream directed to the microscope's input optics 29. It is anticipated that the function provided by the steering optics could also be performed by conductive optic fibers.

The combined light stream, after leaving input optics 29, is input to a dark-field condenser 30. A sample (not shown) is held in a sample plane 31, by conventional means. The combined light stream output from the dark-field condenser 30, illuminates the sample in a manner such that the excitation radiation, represented by rays 32 and 34, falls outside of the scope of an objective lens 36. In that manner, the excitation illumination is separated from the fluorescence of the sample so that out-of-bandwidth radiation is minimally commingled with fluorescence from the sample.

The objective lens 36 produces an image of the sample which may be filtered by a second acousto-optic tunable filter 38. The AOTF 38 is tuned by the generator 17 through the second of the independent output amplifiers. After the image has been filtered, it may be captured, for example, by a charge coupled device (CCD) 40. The CCD 40 is under the control of a controller 42 which is in communication with an image processing work station 44. The CCD device 40 may capture the image which is stored in the image processing workstation 44. A CCD controller 42 is also provided. After the image has been stored, known software routines for examining the image, or for further processing the image, may be performed.

The excitation AOTF 16 may be implemented by a first crystal while the emission AOTF may be implemented by a second crystal satisfying the following parameters and available from NEOS Technologies:

| Crystal # | Aperture | W | H | L | $\theta_i$ | $\theta_a$ | $\theta_f$ | Tranducer Length | Frequency Range |
|---|---|---|---|---|---|---|---|---|---|
| 16 | 25 mm | 30 mm | 27 mm | 34 mm | 8° | 3.95° | 10.95° | 15 mm | 34–81 MHz |
| 38 | 17 mm | 22 mm | 22 mm | 48 mm | 12° | 5.9° | 16.35° | 27 mm | 48–107 MHz |

Figures 14A, 14B:
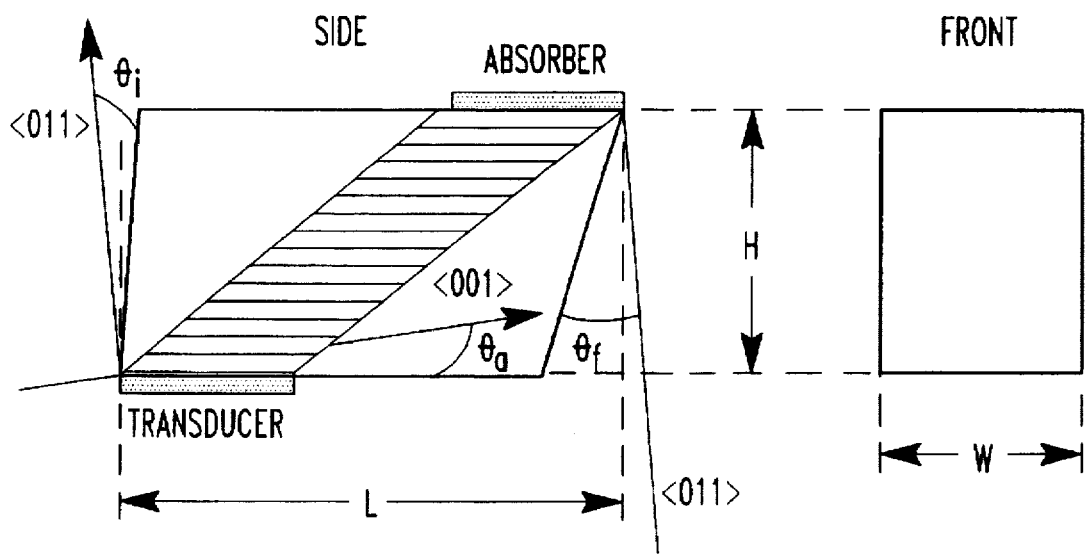
FIGS. 14a and 14b define the AOTF parameters.

The AOTF parameters in the preceding table are defined in FIGS. 14a and 14b. The AOTF's 16 and 38, under the control of workstation 18 as shown in FIG. 1, can provide rapid wavelength switching, rapid shuttering, and control over the intensity of the excitation radiation.

Theoretical Background

The presence of an acoustic wave inside a medium creates a periodic modulation of its index of refraction via the elasto-optic effect. This modulation acts as a three-dimensional sinusoidal phase grating for light incident on the crystal, leading to diffraction of certain wavelengths at an angle from the incident beam direction. In an acousto-optic tunable filter, this diffracted light is used as the filter output, and the grating frequency is electronically controlled by varying the RF frequency applied to a piezoelectric transducer bonded to one of the faces of the crystal. That results in an all-electronic, broadly tunable spectral filter with tuning speeds determined by the acoustic transit time in the crystal (typically under 50 μs).

Figure 12A:
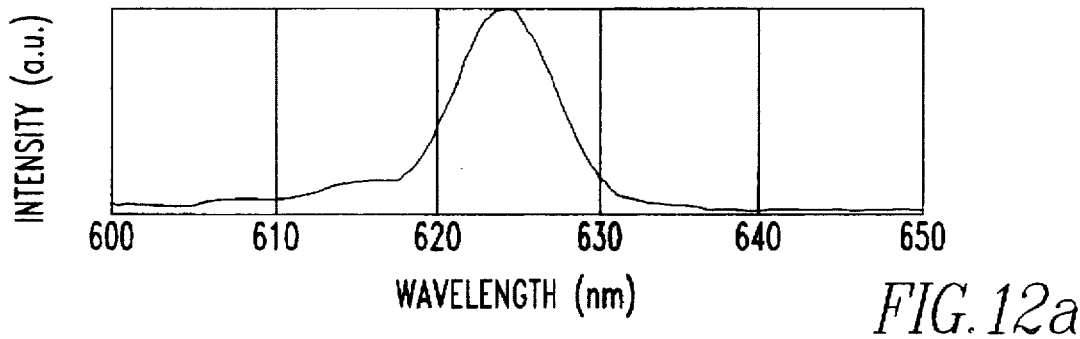
FIGS. 12a–12c illustrate electronic control of AOTF filter bandwidth.
Figure 12B:
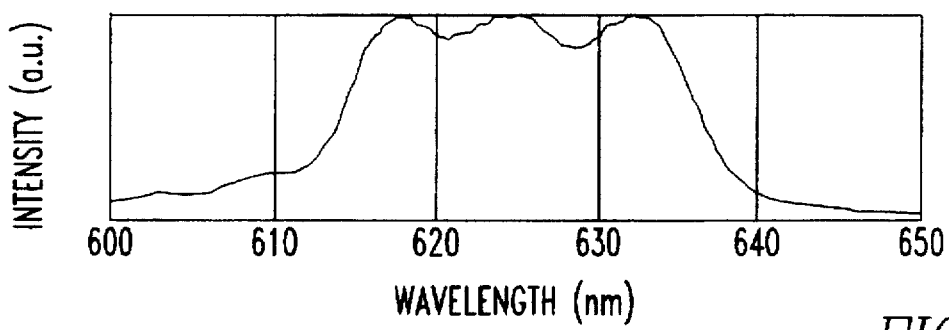
Figure 12C:
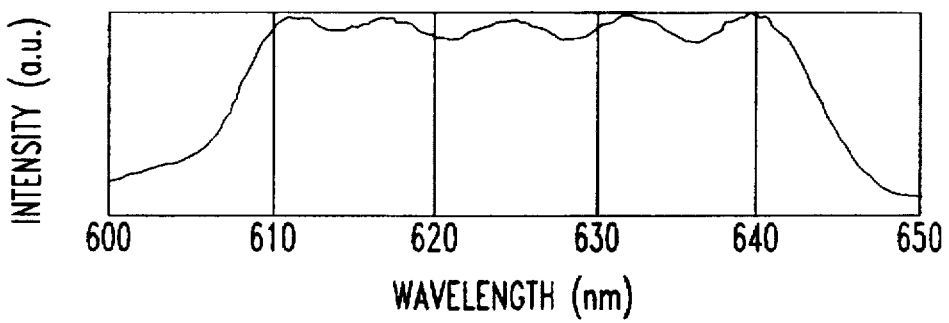
Figure 13:
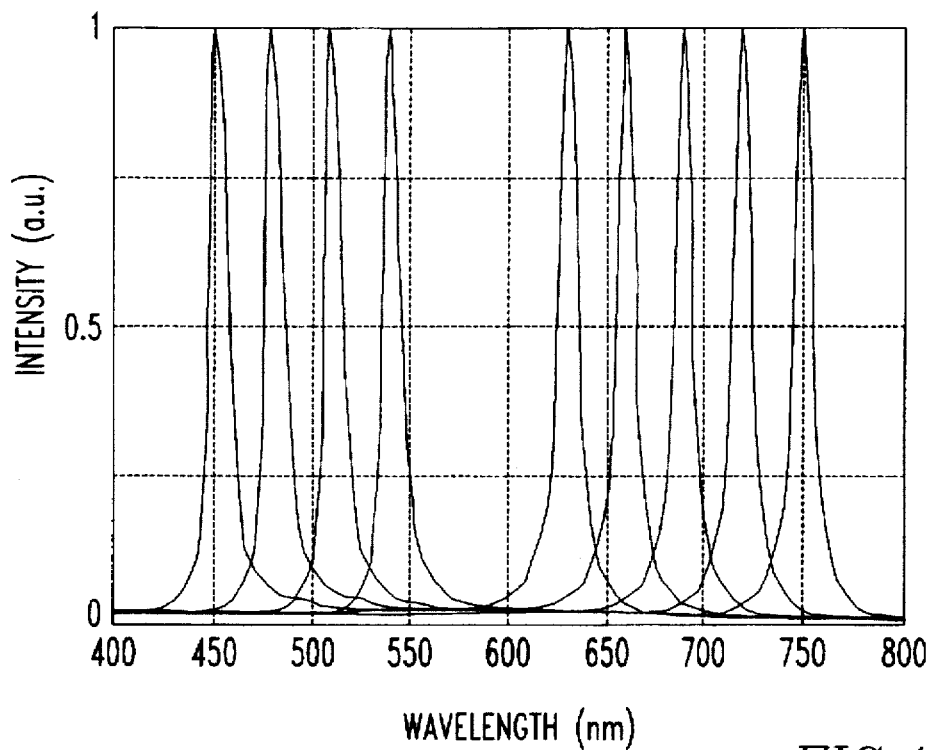
FIG. 13 is an illustration of the electronic control of AOTF filter bandwidth.

When driven with multiple closely-spaced RF frequencies, the AOTF also provides electronically variable bandwidth control. As shown in FIGS. 12a–12c, combinations of frequencies can be used to increase the light throughput of the crystal. FIG. 12 illustrates intensity versus wavelength graphs for one frequency (FIG. 12a, $\Delta\lambda=7.5$ nm), three frequencies (FIG. 412b, $\Delta\lambda=23$ nm), and five frequencies (FIG. 12c, $\Delta\lambda=37$ nm). FIG. 13 demonstrates the broad electronic tuning of the crystal throughout the visible spectrum.

Figure 2:
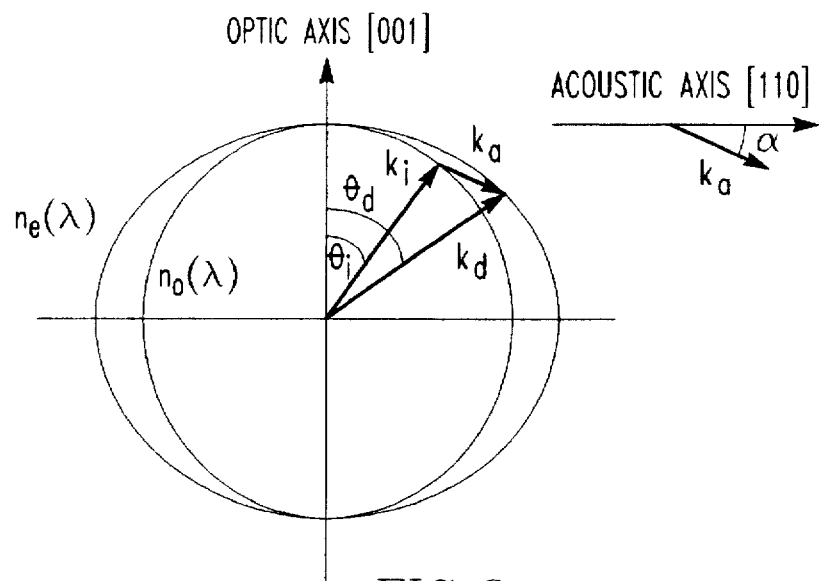
FIG. 2 illustrates phase-matching in a noncolinear AOTF.

The interaction of acoustic and optical plane waves in an anisotropic medium may be described by a pair of coupled differential equations. Useful solutions to these equations occur when the phase-matching conditions are satisfied:

$$k_d = k_i + k_a \quad (1)$$

where $k_d=2\pi n_d/\lambda$, $k_i=2\pi n_i/\lambda$, and $k_a=2\pi F/V$, with F the acoustic frequency, V the acoustic speed in the crystal, $\lambda$ the optical wavelength, and $n_{i,d}$ the crystal indices of refraction for the incident and diffracted beams, respectively. For the case of an o-polarized incident wave (this is the preferred polarization for imaging in a $TeO_2$ AOTF), equation (1) may be written:

$$n_e(\lambda,\theta_d)\cos(\theta_d) - n_o(\lambda)\cos(\theta_i) + F\lambda/V\sin(\alpha) = 0 \quad (2)$$

$$n_e(\lambda,\theta_d)\sin(\theta_d) - n_o(\lambda)\sin(\theta_i) - F\lambda/V\cos(\alpha) = 0$$

where $\theta_i$ and $\theta_d$ are the angles between the incident and diffracted beam wave-vectors and the optic axis, $n_e$ and $n_o$ are the extraordinary and ordinary indices of refraction, and $\alpha$ is the angle between the acoustic wave-vector, $k_a$, and the acoustic axis, as shown in FIG. 2. These equations determine the spectral tuning characteristics of AOTFs.

Figure 3:
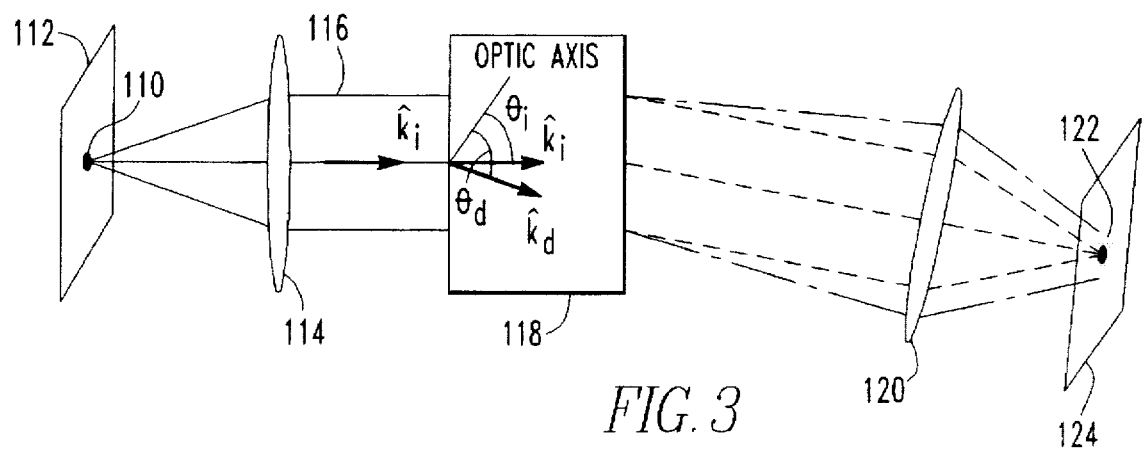
FIG. 3 illustrates the light path in an ideal AOTF imaging system.

For AOTF imaging applications, image fidelity must also be considered. The use of an AOTF as an imaging filter for o-polarized white light is illustrated in FIG. 3. A sample 110 to be imaged lies in a sample plane 112. Light fluorescing from the sample 110 is input to input optics 114 which produce o-polarized collimated light represented by light rays 116. The light rays 116 are input to an AOTF 118 which produces e-polarized detracted beams at wavelength $\lambda$. The diffracted beams at wavelength $\lambda$ are input to output optics 120 which focus an image 122 onto an image plane 124.

In the configuration illustrated in FIG. 3, every point on the sample 110 gives rise to a bundle of multichromatic parallel rays 116 incident on the crystal 118 at a single angle $\theta_i$. Ideally, as shown by the dashed lines in FIG. 3, the diffracted portion of this bundle should exit the crystal 118 as a bundle of monochromatic parallel rays described by a unique $\theta_d$. In that case, each point on the sample plane 112 will map to a single point on the image plane 124. In practice, however, it is found that the diffracted ray bundle consists of rays leaving the crystal 118 over a range of different output angles as indicated by the dashed-dot lines in FIG. 3. As a result, each sample plane point maps to a distribution of image plane points, leading to a blurred image even for fixed frequency operation.

A second image degrading effect, image shift, occurs when the radio frequency, F, is varied. The phase matching equations (2) dictate that changes in F result in changes in both the wavelength, $\lambda$, and the diffracted angle, $\theta_d$, for fixed $\theta_i$ and $\alpha$. That leads to a shift in image position for different wavelengths. Appropriate cut of the crystal exit face, however, can eliminate that almost entirely.

Because the transducer (not shown in FIG. 3) attached to the AOTF 118 is of finite length, the acoustic field it produces may be described as a superposition of plane waves at various acoustic angles, $\alpha$. For white light illumination at a given operating frequency, F, and incident beam direction, $\theta_i$, each such $\alpha$ will produce a diffracted output at a distinct angle $\theta_d$ and wavelength $\lambda$. The spread in acoustic angle resulting from the finite transducer length consequently gives a diffracted output containing a range of angles and wavelengths, even for fixed incident beam direction, resulting in a filtered image which is blurred. AOTF image blur is, therefore, primarily attributable to acoustic beam divergence in the crystal.

For negligible incident light depletion (an approximation valid for AOTF efficiencies up to about 70%), the relationship between the acoustic angle intensity spectrum and the diffracted output intensity spectra may be derived explicitly for plane waves from the AOTF interaction equations. For fixed F and $\theta_i$ we have:

$$I_{out}(\lambda,\theta_d) = C^2 x I_{inc}(\lambda) x I_\alpha(\alpha) x \delta[K_d(\theta_d,\lambda) - K_i(\theta_i,\lambda) - K_a(\alpha,F)]. \quad (3)$$

In this equation, $I_{out}$ is the diffracted intensity; C is a constant; $I_{inc}$ is the wavelength spectrum of the incident light; $I_\alpha$ is the acoustic angle intensity spectrum, proportional to the squared magnitude of the Fourier transform of the transducer profile in the direction of light propagation; and the delta function, $\delta$, expresses the phase matching requirement. In the case of white light illumination ($I_{inc}$=constant), this equation shows that the diffracted intensity is directly proportional to the acoustic angle spectrum:

$$I_{out} \sim I_\alpha(\alpha). \quad (4)$$

Because both $\lambda$ and $\theta_d$ are functions of $\alpha$ via the phase-matching equations (2), $I_{out}$ can be expressed either in terms of wavelength or in terms of output angle. When expressed in terms of wavelength, $I^\lambda_{out}(\lambda)$, it may be identified as the bandpass profile of the filter; when expressed in terms of angle, $I^{\theta d}_{out}(\theta_d)$, it may be interpreted as the image blur profile. This equation shows that both of these are determined by the Fourier transform of the transducer structure.

The importance of the acoustic angle distribution on the spectral bandpass of an AOTF is well-known but has not been thoroughly investigated because for the majority of imaging AOTFs operating with a 10 μm or greater spatial resolution, the effect of the acoustic angle distribution on image quality is insignificant. However, for an image resolution of a few microns or less, as needed in microscopy, this effect becomes highly significant. The following experimental setup was designed to quantify this effect.

Experimental Setup

Figure 4:
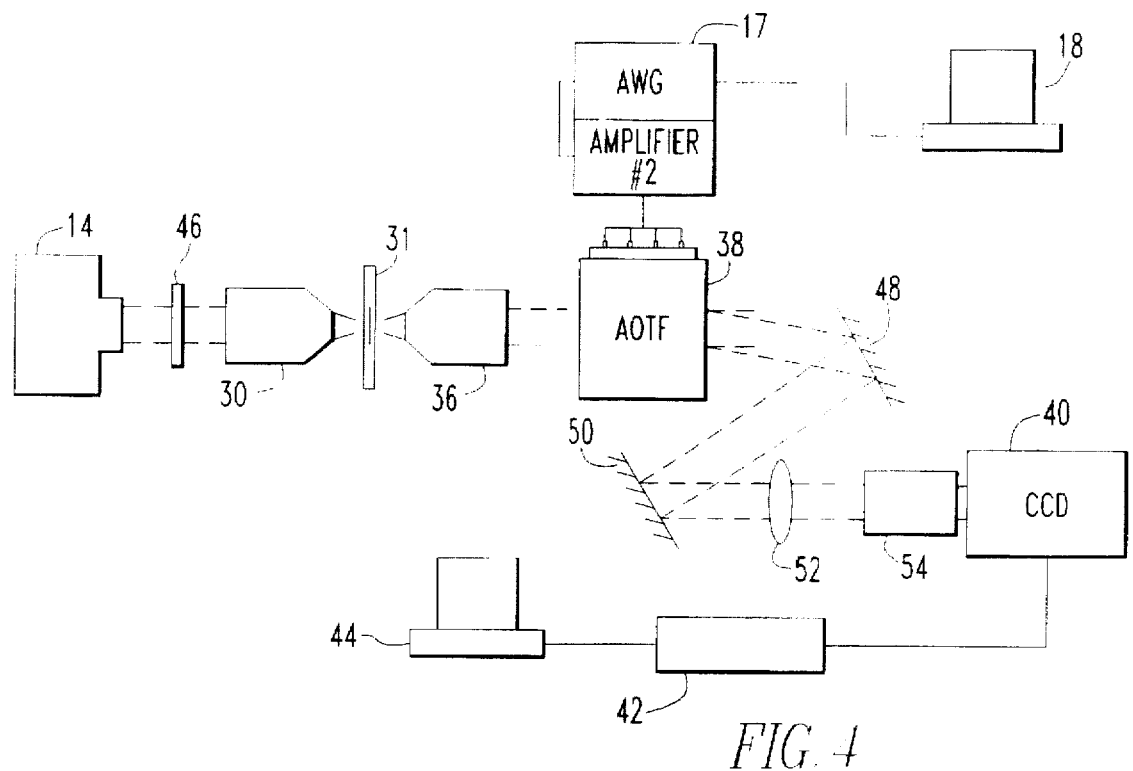
FIG. 4 is a schematic of a light microscope incorporating an imaging system constructed according to the teachings of the present invention which was used to conduct tests.

FIG. 4 is a schematic of a light microscope incorporating an imaging system constructed according to the teachings of the present invention which was used to conduct tests. In FIG. 4, components performing the same function as those identified in conjunction with FIG. 1 carry the same reference numeral. In FIG. 4, the arc lamp 14 produces light which passes through an excitation filter 46 before being input to the dark-field condenser 30. Light from the dark-field condenser 30 is used to illuminate a sample (not shown) held in the sample plane 31. The objective lens 36 is responsive to the light fluoresced by the sample. The light gathered by the objective lens 36 is input to the second AOTF 38 which is under the control of the arbitrary waveform generator 17 and the AOTF work station 18.

The light output from the AOTF 38 passes through steering optics, i.e., mirrors 48, 50, to a tube lens 52 and a two power coupler 54 before being input to the CCD camera 40. The CCD camera 40 is under the control of the CCD controller 42 and the imaging work station 44.

The AOTF crystal used for filter 38 consists of a five centimeter long $TeO_2$ crystal with an optical aperture of seventeen millimeters, cut for an incident optical angle of twelve degrees and an acoustic angle of 5.95°. The exit face angle is cut at 16.35° to eliminate image shift. The transducer is sectioned into seven slices, each 0.33 cm in width. The transducer has four independent input ports: three ports are connected to two slices each, and one is connected to a single slice. The main outstanding feature of that design is the crystal's unusual length and its impact on device performance as will be described in detail below.

Drive electronics are controlled by a Macintosh IIci computer 18 and include a 400 MHz Arbitrary Waveform Generator 17 (LeCroy model LW420) and a single channel four-output broadband RF amplifier (amplifier #2) with four watt maximum total output (NEOS Technologies). Operation is possible from 50–110 MHz, corresponding to diffracted optical wavelengths between 450–800 nm.

The AOTF 38 is installed behind the objective lens 36 in a research-grade fluorescence microscope (Zeiss Axioplan). Sample illumination is performed in transmission using either a seventy-five watt xenon or one hundred watt mercury arc lamp (Zeiss). For the fluorescence measurements, a standard rhodamine excitation interference filter 46 is also used (Omega, 540DF19). Microscope optics include a dark-field condenser 30 (Zeiss part no. 445315; minimum NA=1.2, maximum NA=1.4), and 40x and 100x oil-immersed iris objectives 36 (Olympus UApo 340(40x), 0.65<NA<0.35; and UPlanFl(100x), 0.6<NA<1.3). Darkfield optics are used to compensate for the inadequate background rejection of the present AOTF crystal 38.

Images are recorded using a CCD camera 40 with a 1317×1035 array of 6.8 µm square pixels (Princeton Instruments model CCD 1317-K; Kodak KAF1400 CCD array) coupled to the microscope with a two power coupler 54 (Diagnostic Instruments model HRP-200). Images are stored and processed on a Macintosh 7100 computer 44.

Figure 5:
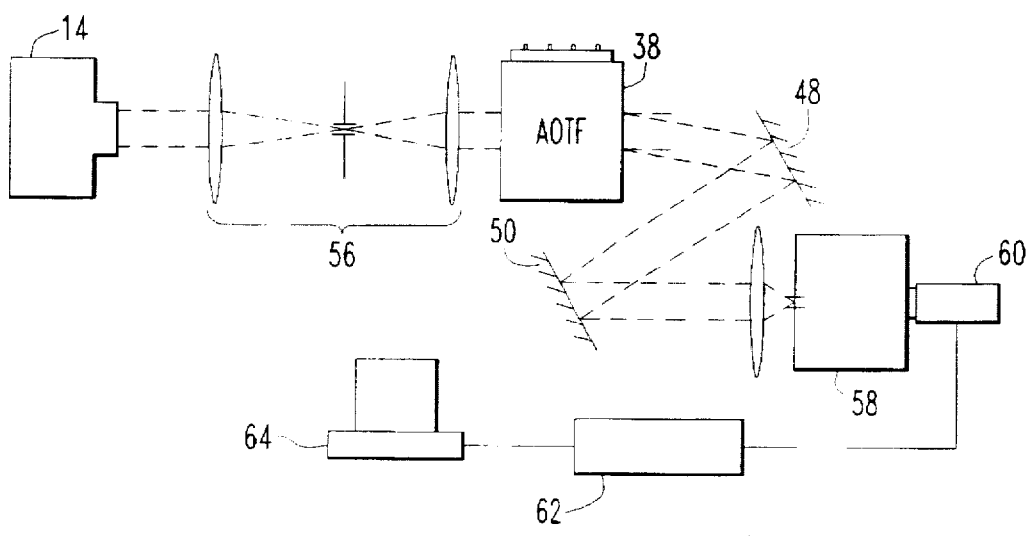
FIG. 5 is an experimental setup to perform wavelength measurements outside the microscope of FIG. 4.

Wavelength measurements are performed outside the microscope of FIG. 4 with the apparatus shown in FIG. 5. The seventy-five watt xenon lamp 14 is followed by a spatial filter 56 with a tightly closed iris at its focus which produces nearly parallel rays of white light at the entrance to the AOTF 38. The diffracted beam leaving the AOTF crystal 38 is directed into an optical multichannel analyzer consisting of a ¼-m monochromator 58 (Photon Technology International) and silicon array detector 60 (EG&G model 1420 with EG&G model 1461 controller 62) under computer 64 control.

Experimental Results

The diffracted intensity distribution from an AOTF, Iout ($\lambda, \theta d$), is ultimately determined by the topology of its transducer. To experimentally demonstrate this relationship, we placed opaque 0.121 µm diameter polystyrene beads (Molecular Probes, Inc.) in the sample plane 31 of the set-up shown in FIG. 4. When excited with the seventy-five watt xenon lamp, each bead appears as a quasi-point source of white light through the infinity-corrected optics of the microscope. That gives rise to a bundle of nearly parallel rays at $\theta_i$ entering the AOTF 38. For a given operating frequency, therefore, the resulting AOTF output is well described by the diffracted intensity distribution $I_{out}$ of equation (4). Changing the transducer profile by disconnecting one or another of the transducer ports should consequently result in substantially different AOTF bead images.

Figure 6A:
FIGS. 6a through 6c illustrate three photographs of dark-field images of 0.121 micron opaque beads taken at a frequency of 74 MHz using one (FIG. 6a), two (FIG. 6b), and six (FIG. 6c) transducer slices corresponding to transducer lengths of 0.33 micron, 0.66 micron, and 1.98 micron, respectively.
Figure 6B:
Figure 6C:

Dark-field images of the single 0.121 µm diameter bead taken through the AOTF 38 with a 40x objective 36 are shown in FIGS. 6a–6c for one, two, and six transducer slices, respectively, corresponding to transducer lengths of 0.33 µm, 0.66 µm, and 1.98 µm, respectively. The images were taken with the AOTF 38 operating at a frequency of 74 MHz and an efficiency of approximately 60%. The color scale in FIGS. 6a–6c is not linear. The center bright spot in each figure represents the primary AOTF image of the bead; the narrower this spot, the better the AOTF resolution. The increase in resolution with longer transducer length expected from equation (4) is clearly evident. The center spot in FIG. 6c, produced by six transducer slices, corresponds to a resolution of 1 µm. The secondary spots on either side of the center arise from the sidelobes in the transducer Fourier transform. These are reduced in intensity relative to the main peak by one to two orders of magnitude. Note the differences in number, placement, and relative intensity of the sideband peaks for each of the various transducer configurations of FIGS. 6a, 6b, and 6c.

Figure 7A:
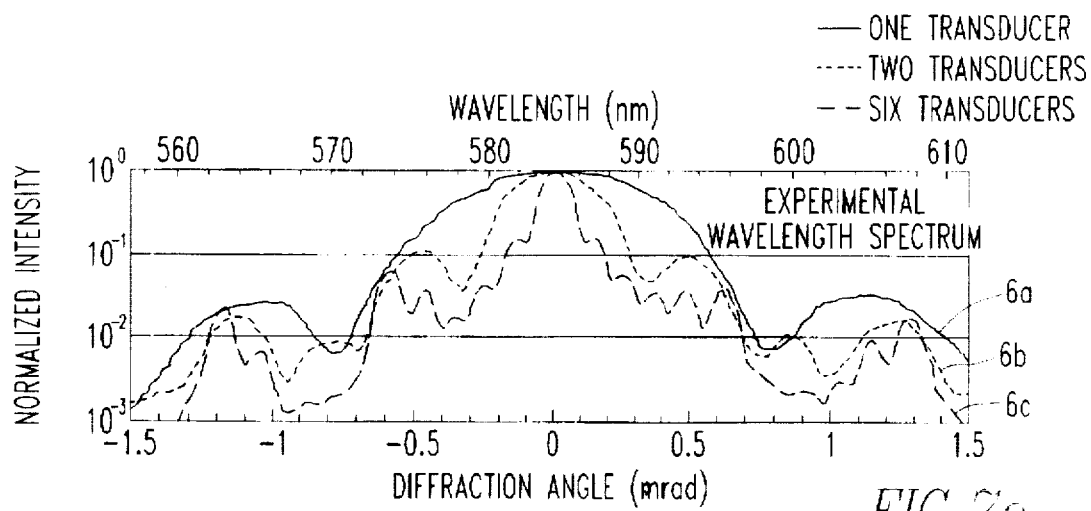
FIGS. 7a through 7c are graphs illustrating intensity versus wavelength data (FIG. 7a), intensity versus angle data (FIG. 7c), and theoretical results (FIG. 7b) for the three different images of FIGS. 6a–6c.
Figure 7B:
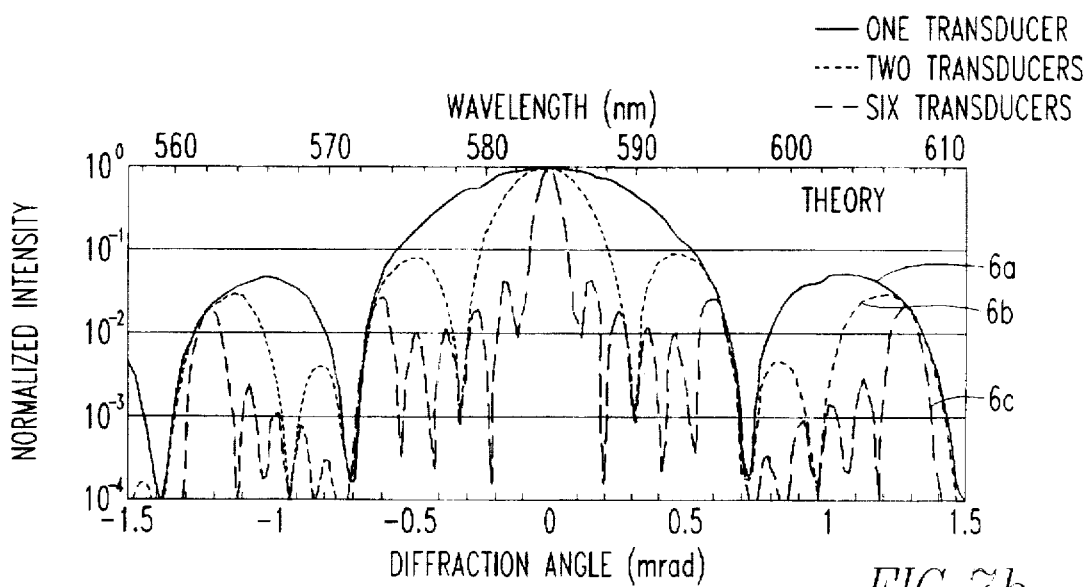
Figure 7C:
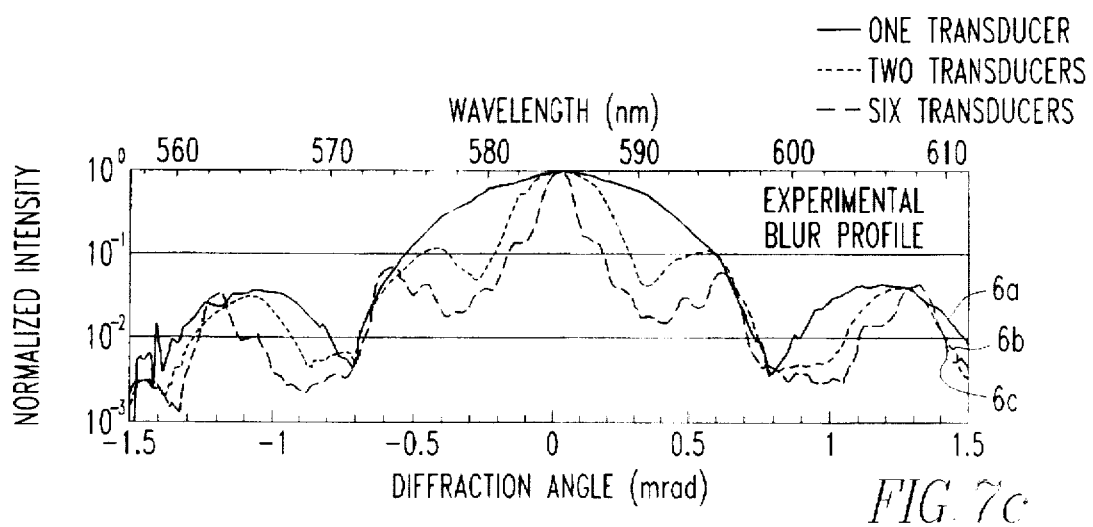

FIGS. 7a–7c quantify the data of FIGS. 6a–6c and compare it to theory. FIG. 7a displays the dependence of intensity on wavelength for FIGS. 6a–6c measured using the set-up shown in FIG. 5. FIG. 7c displays the dependence of intensity on AOTF output angle (it is proportional to distance from the central spot) for FIGS. 6a–6c. These were obtained by taking intensity profiles of images obtained with the CCD 40 of FIG. 4, and are, in effect, measurements of $I^{\theta d}_{out}$ ($\theta d$). According to equation (4), both sets of data should be proportional to the acoustic angle profiles $I_\alpha$, for each of the transducer configurations shown.

FIG. 7b shows calculated results, computed by taking the squared magnitude of the Fourier transform of each transducer profile, taking into account the slice separation of approximately 0.5 mm. The theoretical curves for these three configurations have pronounced differences in center peak width and side-band structure reflecting the differences between their Fourier transforms. These features are also strikingly evident in the experimental data shown in FIG. 7a and 7c. Indeed, the detailed correspondence between measured and calculated results is a remarkable confirmation of equation (4). FIGS. 7a–7c quantitatively demonstrate the effect of transducer structure on the spectral and angular output characteristics of acousto-optic imaging filter 38.

The diffracted intensity distributions shown result in two types of image degradation. The center peak width leads to decreased image resolution, and the sideband structure leads to decreased image contrast. With the quantitative results shown by FIGS. 7a and 7c, however, these effects can now be compensated for using digital image processing techniques. In particular, the curves of FIG. 7c represent intensity profiles of AOTF images of a white light point source. This is, in effect, the measured white light point spread function (psf) for the AOTF in the microscope. Note that this psf is one-dimensional because AOTF blur occurs only along one axis. With this psf, it is straightforward to use computational image processing to deconvolve the effect of the AOTF image blur from the raw images. Expectation-maximization is ideally suited for this task. See, for example, L. A. Shepp and Y. Vardi, "Maximum-likelihood reconstruction for emission tomography," IEEE Trans. Med. Imag. 1, pp 113–121 (1982) and T. Holmes, "Maximum-likelihood image restoration adapted for noncoherent optical imaging," J. Opt. Soc. Am. A 7, pp. 666–673 (1988).

Figure 8A:
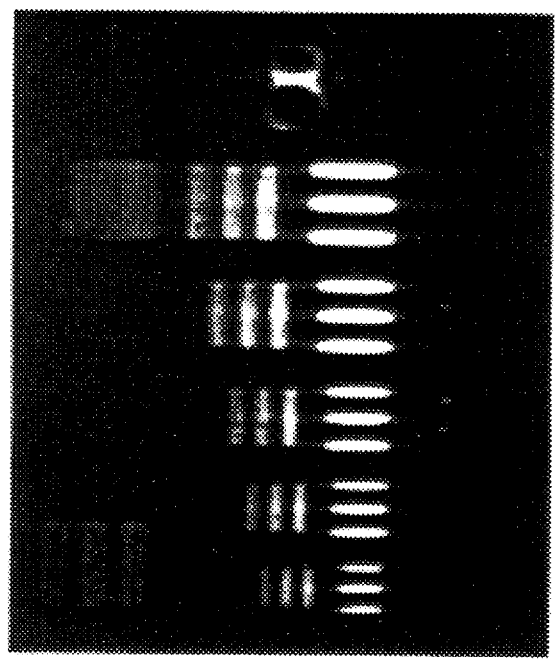
FIGS. 8a and 8b illustrate the effect of image deconvolution on image quality using the standard Air Force resolution target and a transducer length of 1.98 micron shown before (FIG. 8a) and after (FIG. 8b) the convolution.
Figure 8B:
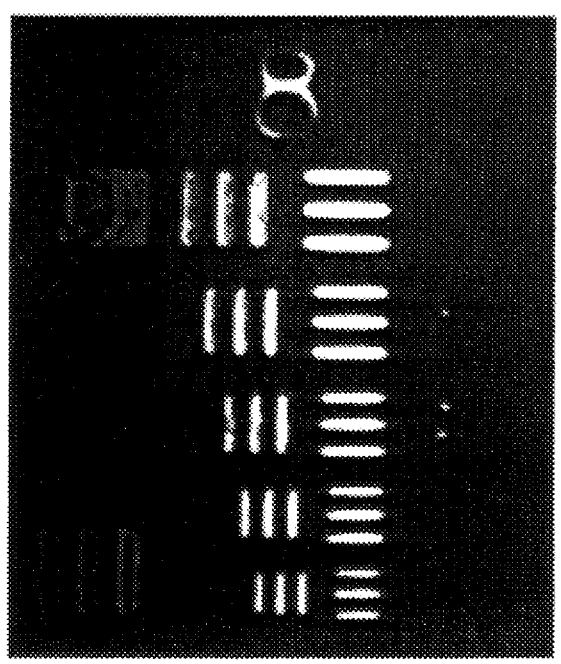

The power of this approach may be seen in FIGS. 8a and 8b. A standard Air Force resolution target (Applied Image) is imaged through the AOTF 38 using white light brightfield illumination with six transducer slices connected. The figure displays Group 8 of this target both before (FIG. 8a) and after (FIG. 8b) processing. AOTF blur is clearly evident in the horizontal direction of the raw image of FIG. 8a. Processing removes much of the sideband-related blur., as well as partially compensating for the width of the central peak of the diffracted intensity distribution. This results in a significant contrast increase in the deconvolved image, as well as a pronounced sharpening of the target lines. The finest pattern at the bottom of the figure consists of 1.1 μm lines and spaces. These are resolved without difficulty.

To resolve even smaller structures and determine more precisely the effectiveness of the deconvolution algorithm, actin fibers in 24-hour serum-deprived 3T3 cells fixed with formaldehyde, stained with rhodamine phalloidin, and mounted in gelvatol were examined. Illumination was provided with the 546 nm line of the one hundred watt mercury lamp. In this case, per equation (3), the white light psf used above must now be multiplied by the actual spectrum of light incident on the AOTF, $I_{inc}$, where:

$$I_{inc}(\lambda) = \eta_{exc}(\lambda) + I_{fl}(\lambda), \quad (5)$$

with $I_{exc}$ the spectrum of the excitation light, $I_{fl}$ the fluorescence spectrum of the stained fibers, and η a constant indicating the relative magnitude of scattered excitation light to fluorescence at the entrance to the AOTF 38.

Figure 9A:
FIGS. 9a, 10a, and 11a are ultra high resolution AOTF images of actin fibers in fluorescence.
Figure 9B:
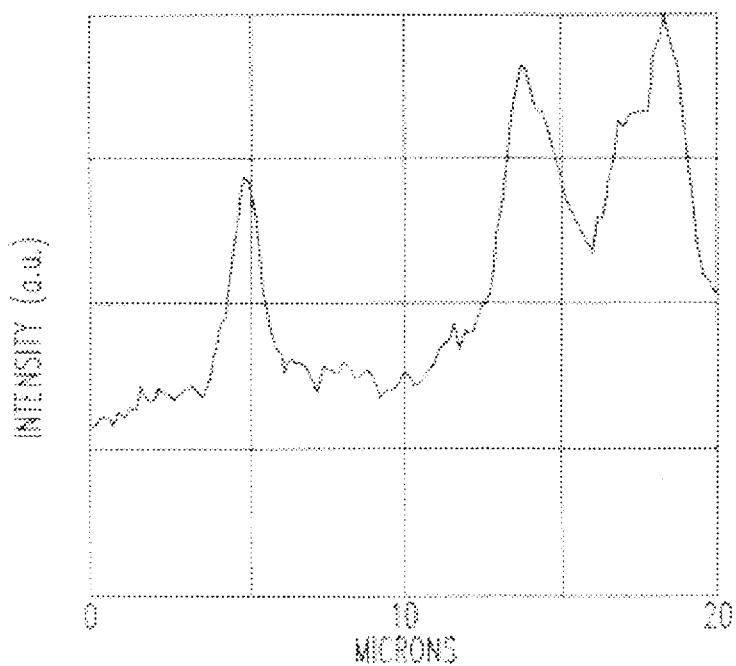
FIGS. 9b, 10b, and 11b are graphs representing line intensity profiles taken along the light lines shown at the bottom right in each of the respective "a" figures.
Figure 10A:
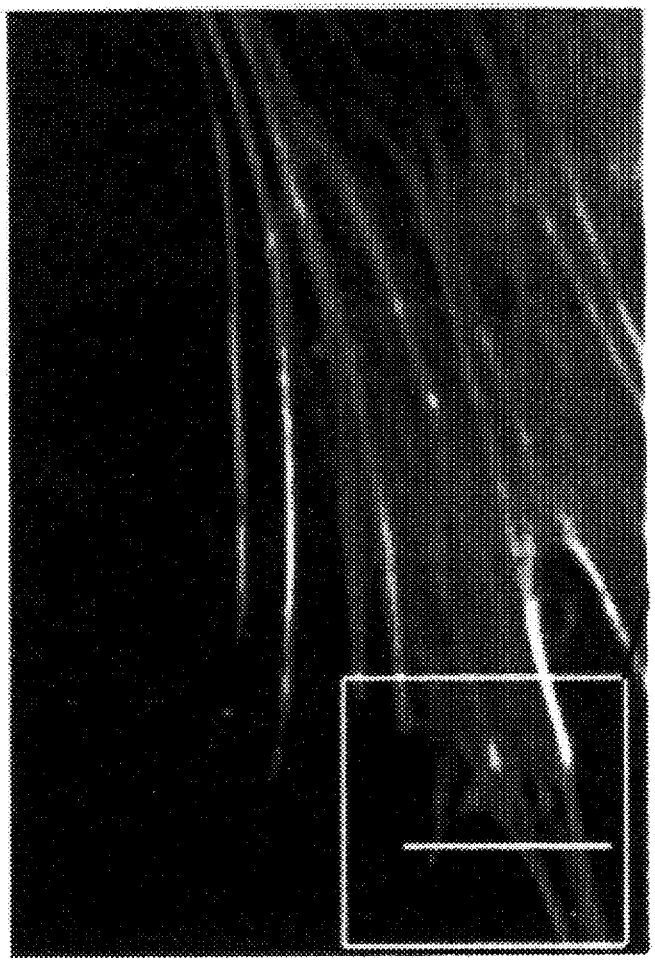
Figure 10B:
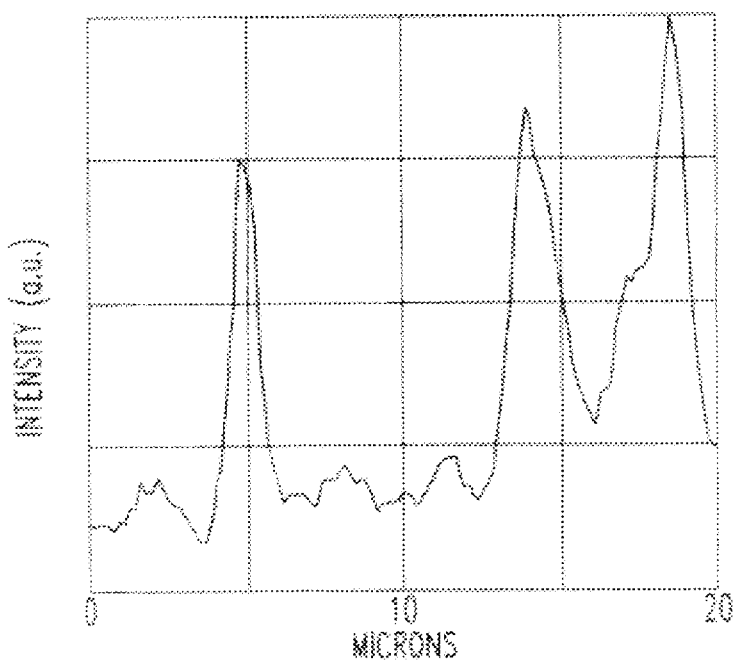

FIGS. 9a and 10a show images of these actin fibers taken with the 40× objective 36 through the AOTF 38 before and after deconvolution, respectively. FIGS. 9b and 10b are intensity profiles taken along the white lines shown in the bottom right corner of each of FIGS. 9a and 10a, respectively. The minimum feature size resolvable in the raw image of FIG. 9a is approximately 1 μm. With deconvolution, resolution is increased to about 0.8 μm, and image contrast is improved approximately threefold. This increased image resolution and contrast with processing may be clearly seen in the intensity profile graphs of FIG. 9b and 10b.

Figure 11A:
Figure 11B:
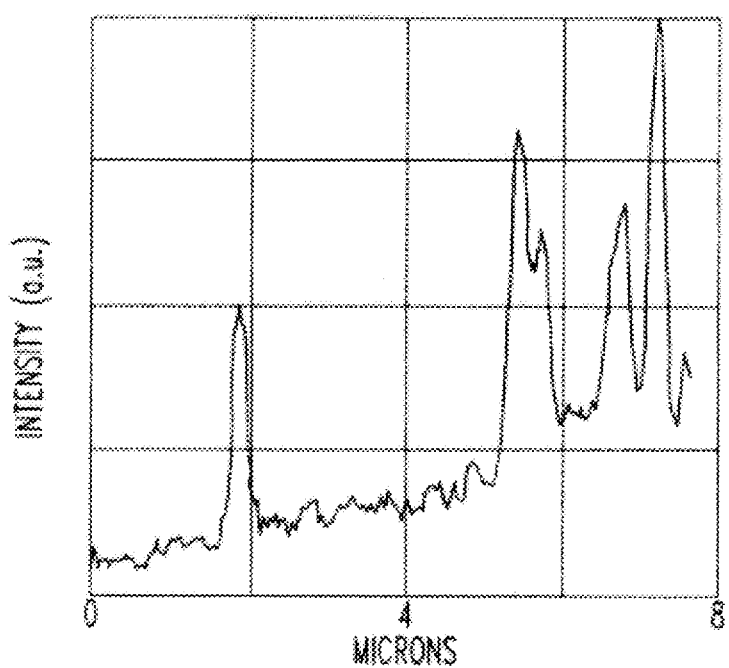

Higher AOTF resolution may be obtained using a 100× objective as shown in FIG. 11a. Here, the angular separation of the ray bundles emanating from two points in the sample plane is magnified by a factor of 2.5 relative to the 40× objective. As a result, the angular blur introduced by the AOTF, which is independent of objective, becomes proportionally less significant. The raw image (not shown) corresponding to the deconvolved image in FIG. 11a, has nearly the same resolution as the processed image, although with several times less contrast. The image shown in FIG. 11a corresponds to that marked by the white rectangle in the lower corner of FIG. 10a. The intensity profile graph shown in FIG. 11b is taken along the same line as in FIGS. 9a and 10a. Features are resolved in the 100× graph of FIG. 11b which are just barely visible in the 40× graph of FIG. 10b. These correspond to a resolution in the 100× image of approximately 0.35 μm, equal to that of a conventional light microscope using mechanical filter wheels.

Conclusions

The three biggest limitations that have thus far restricted the widespread use of AOTFs for imaging spectroscopy are their relatively poor out-of-band rejection, lower throughput (due in part to their polarization selectivity), and their poor imaging quality. The present invention represents a major step in overcoming such limitations. With the superior speed and spectral versatility of the AOTF, the present invention opens up many new and exciting application for AOTFs in high resolution imaging.

Figure 15:
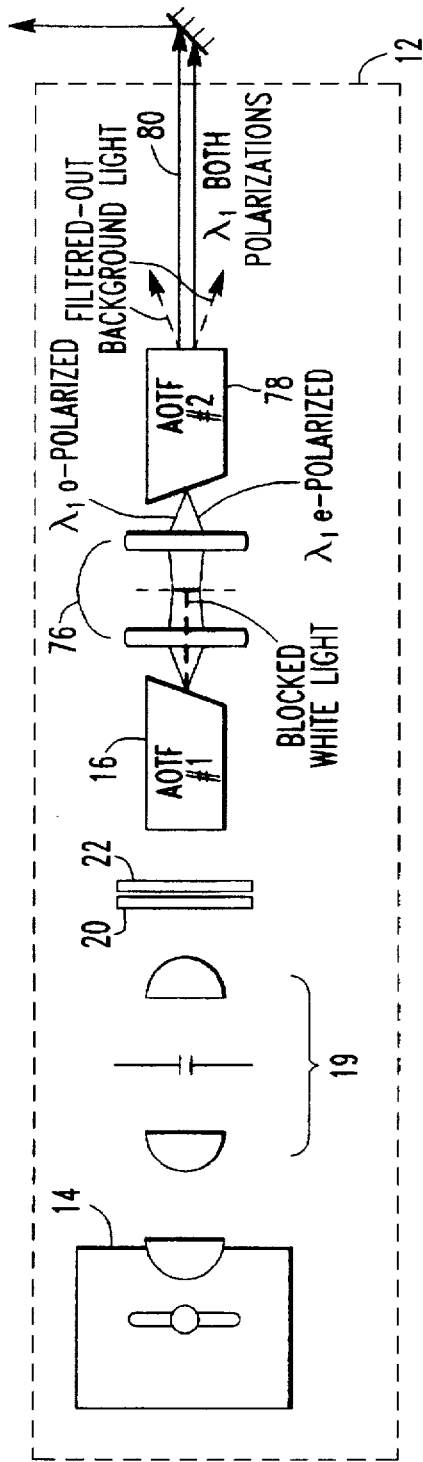
FIG. 15 illustrates an alternative embodiment for the excitation portion of the system illustrated in FIG. 1.

The present invention has been described in conjunction with preferred embodiments thereof. Experimental results have been provided for the purpose of illustration and not limitation. Many modifications and variations of the disclosed embodiments of the apparatus and method will be apparent to those of ordinary skill in the art. For example, FIG. 15 illustrates a modification to the excitation portion 12. In FIG. 15, the collimated light enters AOTF 16 as in FIG. 1. However, the light exiting AOTF 16 is input to spatial filters 76. Following the spatial filters 76 is a second excitation AOTF 78. The spatial filters 76 operate to block the undiffracted white light and to input the two polarizations of the light frequency of interest to the second excitation AOTF 78 in a manner which is opposite to the manner in which they exited from AOTF 16. The result is that the two polarizations exit the second excitation AOTF 78 as a collimated beam 80. Because the collimated beam 80 already contains both polarizations of the light wavelength of interest, optics 24, 25, 26, and 27 from FIG. 1 may be replaced by simpler steering optics.

As has been previously mentioned, AOTFs suffer from poor background rejection. By using a second AOTF, additional excitation light may be lost, but background rejection drops off by a factor of between 50 and 100. Typical parameters for both the AOTF 16 and AOTF 78 may be as indicated in the chart set forth above.

Figure 16:
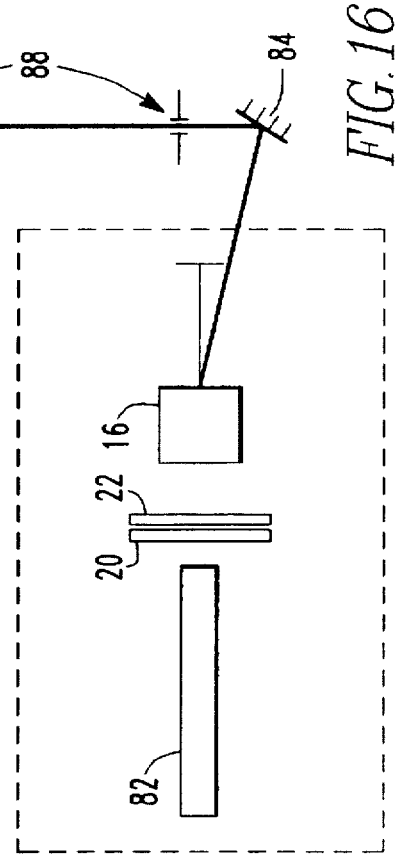
FIG. 16 illustrates a portion of a light microscope constructed according to the teachings of the present invention wherein the light source is a multiline laser.

Another modification to the present invention has been previously mentioned, and that is the use of the multiline laser as the light source 14. FIG. 16 illustrates a portion of a light microscope constructed according to the teachings of the present invention wherein the light source is a multiline laser 82. The multiline laser light 82 is input to the AOTF 16 and the output is directed by steering mirrors 84 and 86 to a focusing lens 90. Because the light source is a multiline laser 82, the need to combine the two polarizations is eliminated such that mirrors 84 and 86 serve only a steering and not a recombination function. Additionally, between mirrors 84 and 86, pin hole openings may be provided as is known for reducing background radiation. From the focusing lens 90, the light passes through a spinning frosted glass 92, as is known in the art, to make the laser beam uniform and incoherent. Thereafter, the light is input to the microscope input optics 94.

Modifications to the imaging portion of the system illustrated in FIG. 1 are also possible. One possible modification is illustrated in FIG. 17. In FIG. 17, the output of AOTF 38 is sent through a correction prism 96 into the CCD camera 40. As mentioned, an AOTF acts as a diffraction grating causing certain frequencies of light to be deflected more than others. As is known, prisms also act to disperse light, but in a direction opposite to those of AOTF's. By proper selection of the angle and material for the correction prism 96, the deflection of the fluorescence's signal caused by the AOTF 38 can be largely compensated for by the correction prism 96, thereby producing an image with greatly enhanced spatial resolution which can then be input to the CCD camera 40. The crystal 38 may be an apodized crystal.

In FIG. 18, another alternative embodiment for the imaging portion of the system illustrated in FIG. 1 is shown. In FIG. 18, it is anticipated that an excitation system of the type illustrated in FIG. 15 or FIG. 16 has been provided. Under those circumstances, rejection of background may be sufficiently high such that excitation illumination may be focused upon the sample 31 by a bright-field condenser 98.

As an alternative to the configuration of FIG. 18, the epi-illumination arrangement of FIG. 19 may be used. As is known, a dichroic beam splitter 100 is provided so that the excitation illumination is delivered by, and the fluorescence signal is collected by, the objective lens 36. The foregoing disclosure and the following claims are intended to cover all such modifications and variations.

What is claimed is:

1. A two-dimensional imaging system, comprising:
   a lens for receiving light from a sample and for forming a two-dimensional image therefrom;
   an acousto-optic tunable filter for receiving the two-dimensional image at an input end thereof and for outputting a filtered image at an output end thereof;
   an amplifier for applying a tuning signal to said filter; and
   a prism for receiving said filtered image, said prism being oriented at an angle with respect to said filter to compensate for dispersion caused by said tunable filter.

2. The system of claim 1 additionally comprising a camera for receiving an image output from said prism.

3. The system of claim 2 additionally comprising means connected to said camera for digitizing the image and a processor connected to said means for digitizing for processing the digitized image.

4. The system of claim 3 wherein said processor includes memory means for storing the processed image.

5. The system of claim 1 wherein said filter includes an apodized crystal.

6. The system of claim 1 wherein said filter includes a tellurium dioxide crystal.

7. The system of claim 1 additionally comprising control means for controlling said amplifier for rapidly switching the wavelength at which said filter is tuned.

8. The system of claim 1 additionally comprising control means for controlling said amplifier for rapidly turning said filter on and off.

9. A system comprising:
   an acousto-optic tunable filter for receiving light at an input end thereof and outputting light at an output end thereof;
   an amplifier for applying a tuning signal to said filter;
   means for holding a sample;
   a dark-field condenser positioned to illuminate the sample;
   an objective lens to collect fluorescence from the sample for input to said input end of said acousto-optic filter; and
   a prism for receiving the light output at said output end of said filter, said prism being oriented at an angle with respect to said filter to compensate for dispersion of said output light caused by said tunable filter.

10. A two-dimensional imaging system, comprising:
    an acousto-optic tunable filter for receiving light at an input end thereof and outputting light at an output end thereof;
    an amplifier for applying a tuning signal to said filter;
    means for holding a sample;
    an objective lens;
    a dichroic filter positioned such that said objective lens illuminates the sample and collects light fluoresced from the sample for input to said input end of said acousto-optic filter through said dichroic filter; and
    a prism for receiving the light output at said output end of said filter, said prism being oriented at an angle with respect to said filter to compensate for dispersion of said output light caused by said tunable filter, and
    wherein said objective lens forms a two-dimensional image from the light input thereto.

11. A system, comprising:
    an acousto-optic tunable filter for receiving light at an input end thereof and outputting light at an output end thereof;
    an amplifier for applying a tuning signal to said filter;
    means for holding a sample;
    a bright-field condenser positioned to illuminate the sample;
    an objective lens to collect fluorescence from the sample for input to said input end of said acousto-optic filter; and
    a prism for receiving the light output at said output end of said filter, said prism being oriented at an angle with respect to said filter to compensate for dispersion of said output light caused by said tunable filter.

12. A system, comprising:
    an acousto-optic tunable filter for receiving light at an input end thereof and outputting light at an output end thereof, said filter comprising a tellurium dioxide crystal approximately five centimeters in length;
    an amplifier for applying a tuning signal to said filter; and
    a prism for receiving the light output by said filter, said prism being oriented at an angle with respect to said filter to compensate for dispersion of said output light caused by said tunable filter.

13. A system, comprising:
    means for holding a sample;
    a dark-field condenser positioned to illuminate the sample;
    an objective lens positioned to collect fluorescence from the sample;
    an acousto-optic tunable filter for receiving light from said objective lens; and
    an amplifier for applying a tuning signal to said filter.

14. The system of claim 13 additionally comprising a prism for receiving the light output by said filter, said prism being oriented at an angle with respect to said filter to compensate for dispersion of output light caused by said tunable filter.

15. The system of claim 13 wherein said tunable filter includes an apodized crystal.

16. The system of claim 13 additionally comprising a camera for receiving light output by said filter.

17. The system of claim 16 additionally comprising means connected to said camera for digitizing an image and a processor connected to said means for digitizing for processing the digitized image.

18. The system of claim 18 wherein said processor includes memory means for storing the processed image.

19. A system, comprising:
    means for holding a sample;
    a bright-field condenser positioned to illuminate the sample;
    an objective lens positioned to collect fluorescence from the sample;
    an acousto-optic tunable filter for receiving light from said objective lens; and
    an amplifier for applying a tuning signal to said filter.

20. The system of claim 19 additionally comprising a prism for receiving the light output by said filter, said prism being oriented at an angle with respect to said filter to compensate for dispersion of output light caused by said tunable filter.

21. The system of claim 19 wherein said tunable filter includes an apodized crystal.

22. The system of claim 19 additionally comprising a camera for receiving light output by said filter.

23. The system of claim 22 additionally comprising means connected to said camera for digitizing an image and a processor connected to said means for digitizing for processing the digitized image.

24. The system of claim 23 wherein said process includes memory means for storing the processed image.

* * * * *

UNITED STATES PATENT AND TRADEMARK OFFICE
CERTIFICATE OF CORRECTION

PATENT NO. : 5,796,512
DATED : August 18, 1998
INVENTOR(S) : Wachman et al.

It is certified that error appears in the above-identified patent and that said Letters Patent is hereby corrected as shown below:

<u>Title page, Item [54], Column 1, line 2,</u>
Delete "SUBICRON" and substitute therefor -- SUBMICRON --;

<u>Columns 3 and 4,</u>
In the heading of the chart (approximately line 36), delete "tranducer" and substitute therefor -- transducer --; and <u>Column 12,</u>
Line 1, delete "claim 18" and substitute therefor -- claim 17 --.

Signed and Sealed this

Twenty-eighth Day of May, 2002

Attest:

Attesting Officer

JAMES E. ROGAN
Director of the United States Patent and Trademark Office